UNITED STATES PATENT OFFICE.

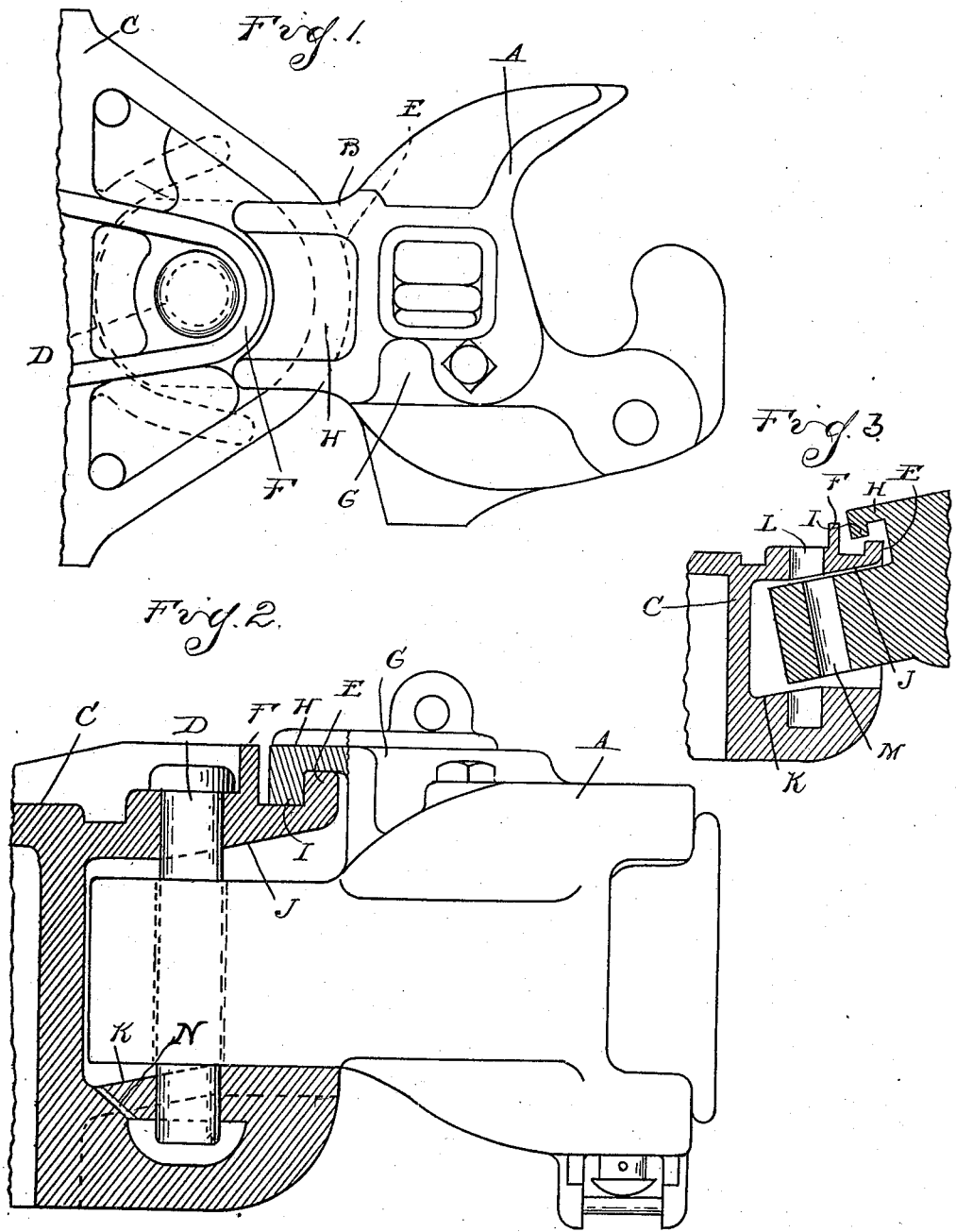

MASON B. GIBERSON, OF DETROIT, MICHIGAN, ASSIGNOR TO MONARCH STEEL CASTINGS COMPANY, OF DETROIT, MICHIGAN, A CORPORATION OF MICHIGAN.

LOCOMOTIVE CAR-COUPLING.

1,132,575.  Specification of Letters Patent.  Patented Mar. 23, 1915.

Application filed June 11, 1914. Serial No. 844,443.

*To all whom it may concern:*

Be it known that I, MASON B. GIBERSON, a citizen of the United States of America, residing at Detroit, in the county of Wayne and State of Michigan, have invented certain new and useful Improvements in Locomotive Car-Couplers, of which the following is a specification, reference being had therein to the accompanying drawings.

The invention relates to locomotive car couplers and comprises certain features of construction as hereinafter set forth.

In the drawings: Figure 1 is a plan view; Fig. 2 is a vertical longitudinal section; and Fig. 3 is a view similar to Fig. 2 but wherein the recess at the end of the aperture for the pivot with the draining means in the socket fitting are omitted, Fig. 3 illustrating the manner of engaging and disengaging the coupler from its socket fitting.

A is the coupler head, B is the shank therefor, C is a fitting which is attached to the frame of the locomotive and which is provided with a socket for receiving the shank of the coupler, and D is a pin for pivotally securing said shank to said fitting. Inasmuch as the entire load of the train must be transmitted through this coupler, it is desirable to relieve the stress from the pivot pin, and to carry it through inter-engaging portions of the coupler and its socket fitting. At the same time, it is necessary to provide for the angular movement of the coupler and also to obtain a construction in which the coupler head and shank may be easily engaged or disengaged from the socket fitting. To accomplish these results, the socket fitting C is formed with a flaring recess or pocket of sufficient angle to permit the maximum angular movement of the coupler shank. The fitting is further provided on its top portion with a segmental, upwardly-projecting flange E concentric with the axis of the pin D, and a second segmental and concentric flange F is spaced from the flange E so as to form a segmental recess therebetween. The coupler head is formed with an upward projection G having a rearwardly-extending portion H and a downwardly-extending segmental hooked flange I adapted to engage the recess between the flanges E and F. Thus when the coupler is in position the flange E will engage with the flange I to transmit a draft from the fitting to the coupler head, while the flange F forms an abutment or compression member for transmitting a stress in the opposite direction. Both of the flanges E and F are sufficiently extended to engage the flange I in all positions of angular movement of the coupler shank within the limits provided by the flaring socket.

To permit of engaging and disengaging the coupler head from the fitting the latter is cut away at the top and bottom of the socket so as to permit of an angular movement of the shank in a vertical plane, and the lifting of the coupler head to cause the hooked flange I to clear the segmental flange E. As shown, the upper wall of the socket fitting has an upwardly-inclined inner face at J in rear of the pin D, while the lower wall has a downwardly-inclined face K in front of said pin. This will permit of the arrangement of the shank as shown in Fig. 3, where the coupler head is tilted upward sufficiently to permit the flange I to clear the flange E. The shank is then dropped into horizontal position and the pin D inserted through registering apertures L and M in the fitting C and shank. This will hold the flanges I and E from accidental disengagement, but there is sufficient clearance provided to relieve the draft from the pin when the coupler is in normal position.

The depression formed in the socket of the fitting will form a pocket in which water may be retained, which would cause difficulty by freezing in cold weather. I have therefore provided drain apertures N connecting with the lowest point in the pocket and permitting the escape of water therefrom.

What I claim as my invention is:—

1. In a car coupler, the combination with a fitting provided with a flaring pocket, of a coupler head having a shank for engaging said pocket, inter-engaging segmental hooked bearings formed integral respectively with said coupler head and fitting and engageable and disengageable by an angular arrangement of the shank in the flaring pocket, and a pivot pin for connecting said shank and fitting, forming a lock for preventing disengagement of said segmental bearings.

2. In a car coupler, the combination with a fitting having a flaring pocket, of a coupler head provided with a shank engageable with said pocket and angularly movable therein in a horizontal plane and also in a vertical plane, inter-engaging segmental hooked bearings integral respectively with said fitting and coupler head and providing for the relative angular movement thereof in a horizontal plane, said bearings being engageable with each other when the shank is tilted in a vertical plane, and a pin for connecting said shank and fitting concentric to said segmental bearings, said pin preventing the tilting of said shank in a vertical plane.

3. In a car coupler, a fitting provided with a flaring pocket, a coupler head having a shank for engaging said pocket and angularly movable therein in a horizontal plane, being also capable of tilting in a vertical plane, inter-engaging segmental hooked bearings integral respectively with said coupler head and fitting and adapted to clear each other when said shank is tilted in a vertical plane, and a pin for connecting said shank and fitting at a point concentric to said segmental bearings, said pin preventing the vertical tilting of said shank to retain said segmental bearings from disengagement, but being provided with sufficient clearance to be relieved from draft stress by said inter-engaging bearings.

4. In a car coupler, the combination with the coupler head provided with a draft shank, of a fitting having a pocket for the reception of said shank, said pocket being under-cut to permit the vertical tilting of said shank in entering, and a drain aperture for the under-cut portion of said pocket.

5. In a car coupler, the combination with the coupler head provided with a draft shank, of a fitting having a pocket for the reception of said shank, said pocket being under-cut to permit the vertical tilting of said shank in entering, inter-engaging portions on said shank and fitting, and a pivot-pin for connecting said shank and fitting forming a lock for preventing dis-engagement of said inter-engaging portions.

In testimony whereof I affix my signature in presence of two witnesses.

MASON B. GIBERSON.

Witnesses:
 JAMES P. BARRY,
 HENRIETTA E. BOWMAN.

Copies of this patent may be obtained for five cents each, by addressing the "Commissioner of Patents, Washington, D. C."